Figure 1:
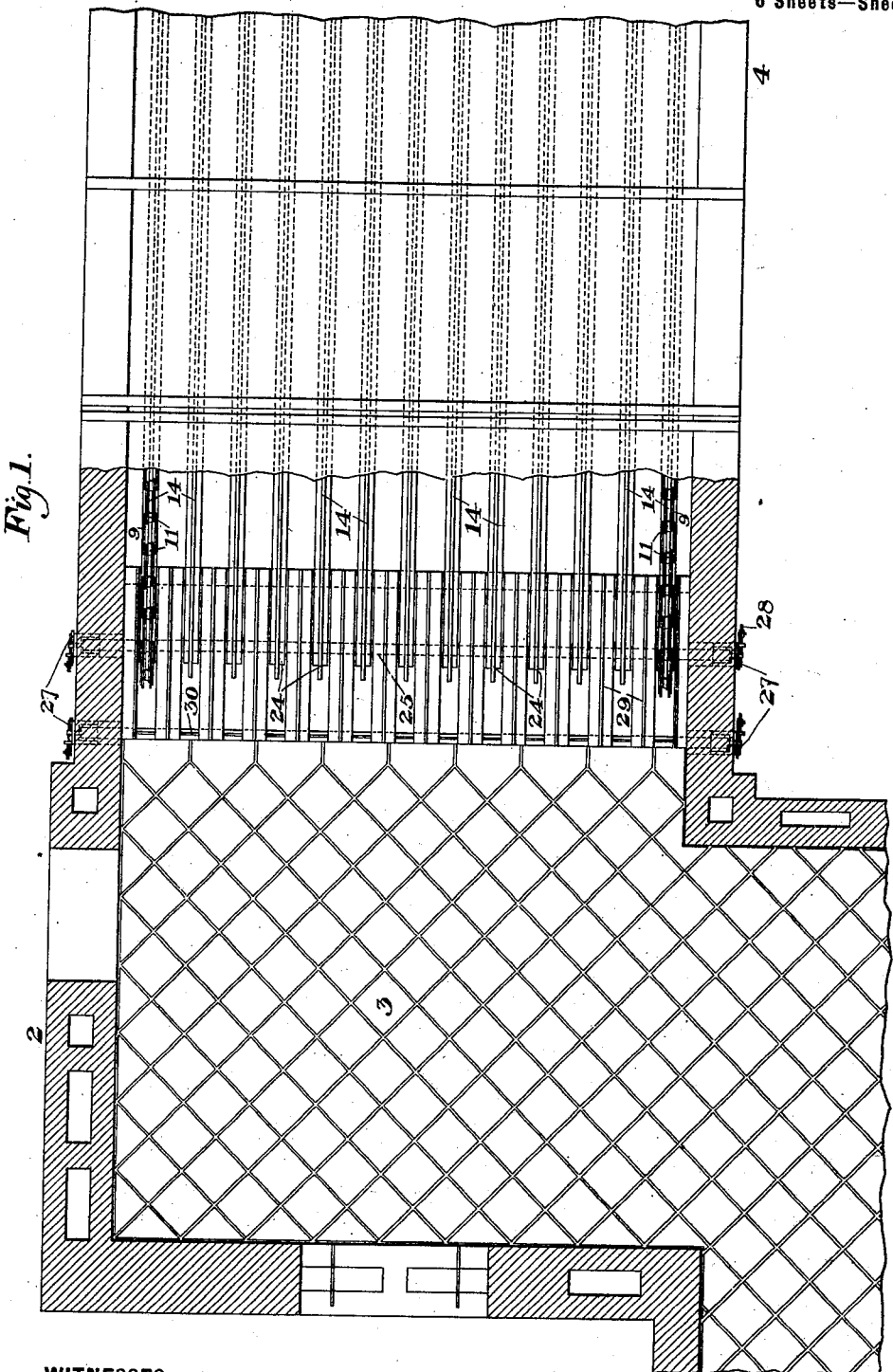

No. 707,343. Patented Aug. 19, 1902.
R. NAYSMITH & B. F. REESE.
LEER.
(Application filed June 24, 1901.)
(No Model.) 6 Sheets—Sheet 1.

WITNESSES
INVENTORS

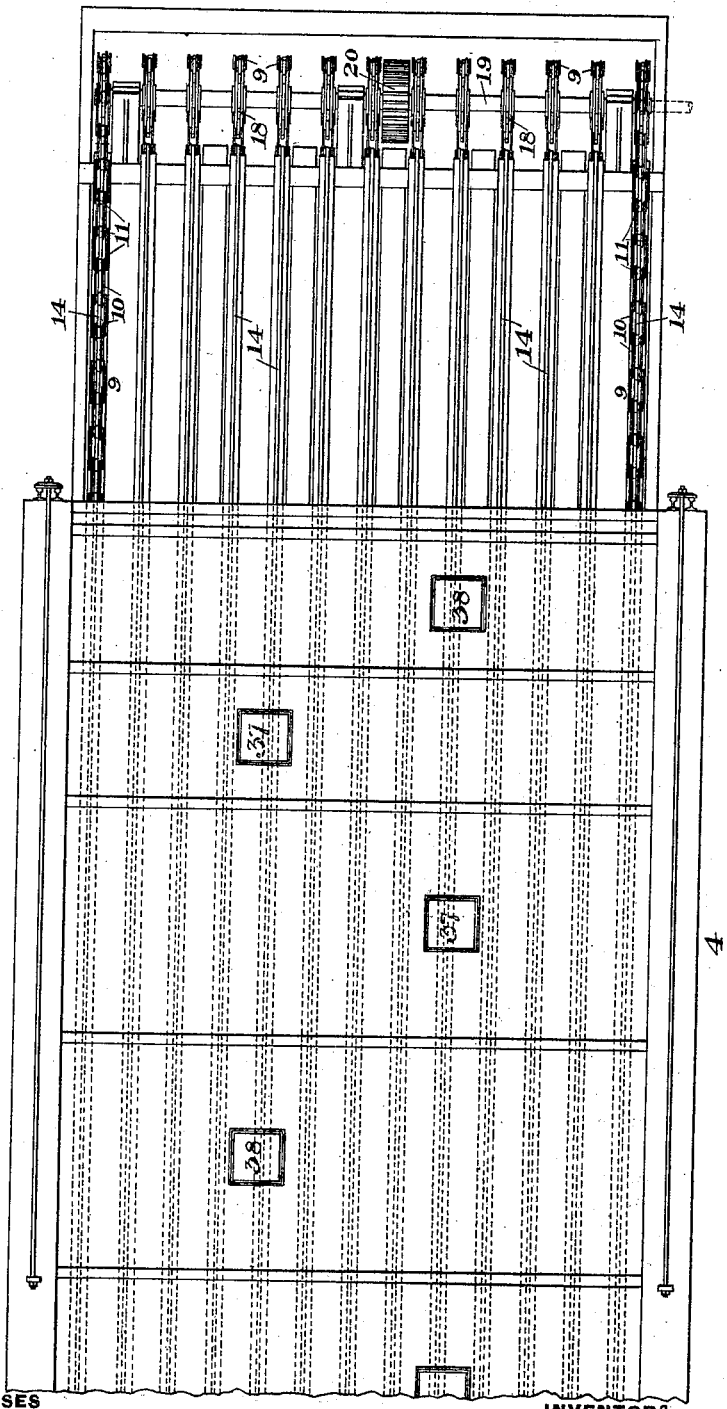

No. 707,343. Patented Aug. 19, 1902.
R. NAYSMITH & B. F. REESE.
LEER.
(Application filed June 24, 1901.)
(No Model.) 6 Sheets—Sheet 3.
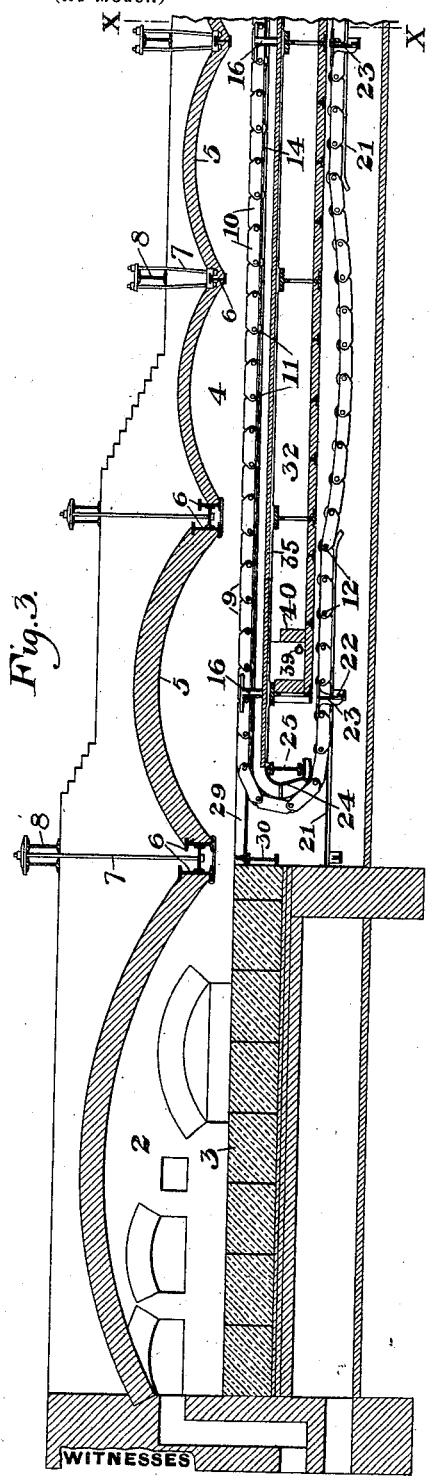

No. 707,343. Patented Aug. 19, 1902.
R. NAYSMITH & B. F. REESE.
LEER.
(Application filed June 24, 1901.)
(No Model.) 6 Sheets—Sheet 4.
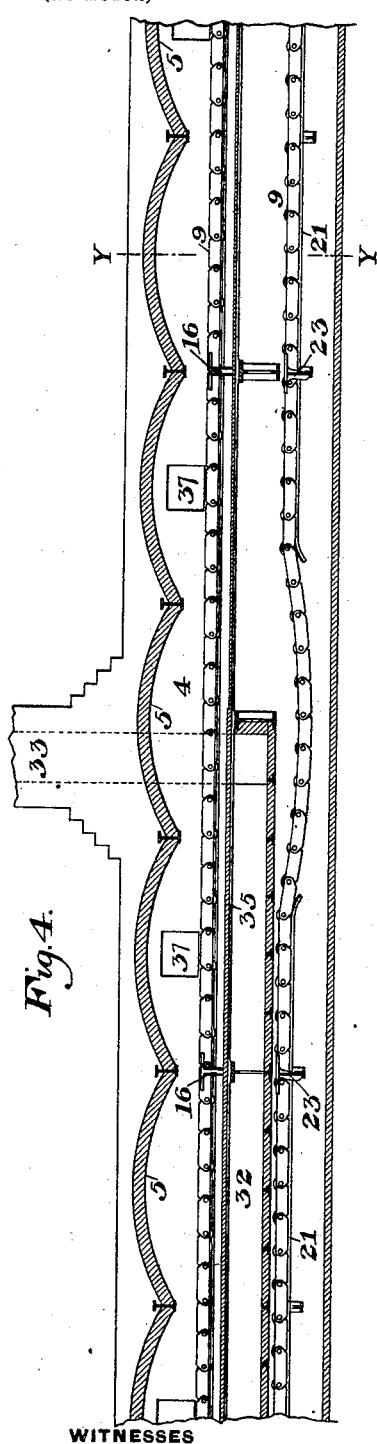

No. 707,343. Patented Aug. 19, 1902.
R. NAYSMITH & B. F. REESE.
LEER.
(Application filed June 24, 1901.)
(No Model.) 6 Sheets—Sheet 5.
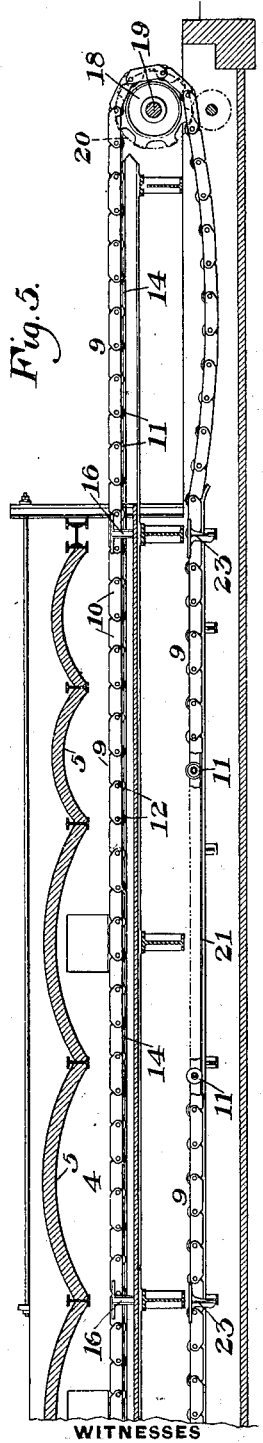
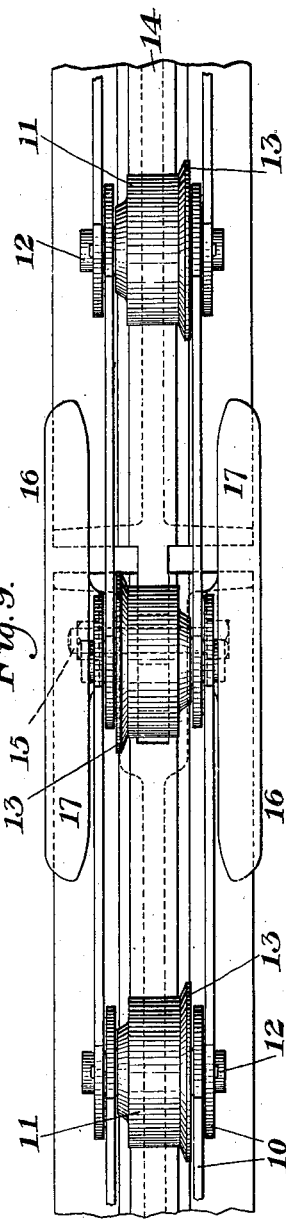
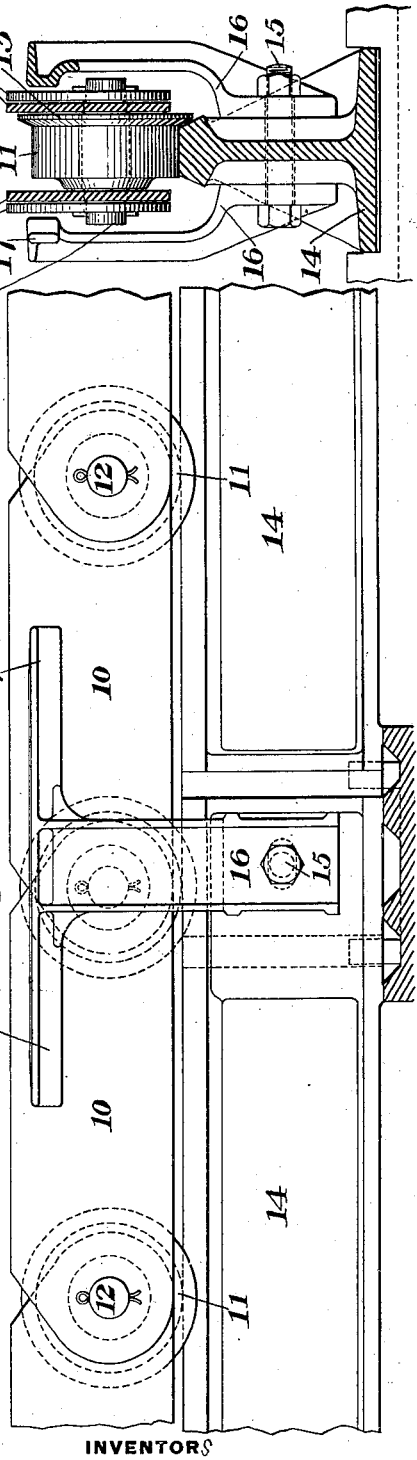
WITNESSES
INVENTORS

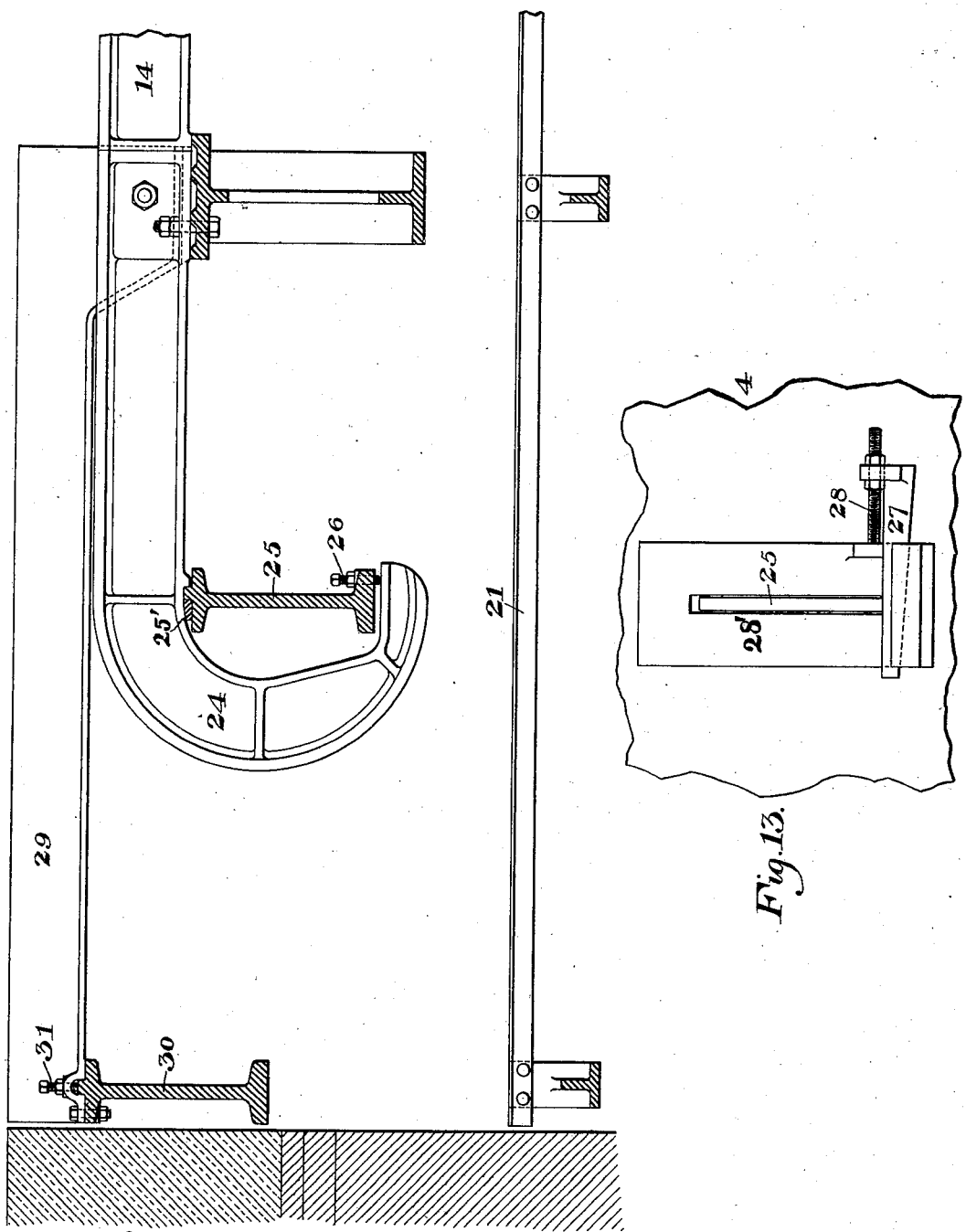

UNITED STATES PATENT OFFICE.

ROBERT NAYSMITH AND BENJAMIN F. REESE, OF KITTANNING, PENNSYLVANIA.

LEER.

SPECIFICATION forming part of Letters Patent No. 707,343, dated August 19, 1902.

Application filed June 24, 1901. Serial No. 65,788. (No model.)

*To all whom it may concern:*

Be it known that we, ROBERT NAYSMITH and BENJAMIN F. REESE, of Kittanning, Armstrong county, Pennsylvania, have invented a new and useful Leer, of which the following is a full, clear, and exact description, reference being had to the accompanying drawings, forming part of this specification, in which—

Figure 1 is a plan view, partly in horizontal section, showing the front end of the leer. Fig. 2 is a plan view of the rear or delivery end of the same. Figs. 3, 4, and 5 are vertical longitudinal sections, showing, respectively, the front portion, the middle portion, and the rear portion of our leer. Fig. 6 is a transverse section, the left-hand half of which is on the line X X of Fig. 3, while the right-hand half is on the line Y Y of Fig. 4. Fig. 7 is a detail side elevation showing a portion of the lower track and chain. Fig. 8 is a cross-sectional view of Fig. 7. Fig. 9 is a top plan view showing a portion of the upper track; and Fig. 10 is a side elevation, and Fig. 11 a cross-section, of the parts shown in Fig. 9. Fig. 12 is a partial longitudinal section of the front end of the leer, and Fig. 13 is a side elevation of an adjusting device for the transfer rails and chains.

Our invention relates to leers for annealing glass, and particularly to those for annealing plate-glass; and its object is to provide a successful and practicable chain leer system therefor.

Heretofore it has been attempted to anneal plate-glass in rod leers; but in such leers the glass has been broken in large amounts by reason of the vertical movement of the rods and by the different temperatures of the successive portions of the rods. These rods, moreover, cause "rod-checks" upon the glass. So far as we are aware we are the first to provide a practical chain leer for the annealing of plate-glass.

Referring to the drawings, in which we show a preferred form of our invention, 2 is an inclosed chamber having a tile floor 3, and which may be the last of a series of chambers through which the glass plates are successively moved on their way to the leer. The leer proper, 4, is connected at its front end to the chamber 2 and is in the form of a long tunnel having transverse roof-arches 5, carried on I-beams 6, which at the front end of the leer are supported by hangers 7, depending from overhead supports 8. The glass plates are moved through this tunnel upon a series of longitudinal chains 9, of which we have shown thirteen, though any desired number may be used. The links 10 of these chains are carefully machined on their upper edges and are finished in jigs, so that they will be of the same dimensions and afford a level even bed for the sheets. Each chain is composed of sets of these links with flanged wheels 11, interposed between the overlapping ends of the links and provided with shafts 12, extending through the link ends. The links are preferably of the form shown in the detail figures, though other forms of links may be used without departing from our invention. The flanges 13 of these wheels are located alternately on opposite sides of the wheels, as clearly shown in Fig. 9, so that the chains are kept accurately in their position upon the rails 14 of the upper track, while at the same time play is afforded to allow for the expansion and contraction of the parts under the heat to which they are subjected. This forming of a part of the wheels with flanges upon one side and of others with flanges on the opposite side is an important feature of our invention.

The rails 14 of the upper track are of general T form and are carefully machined or planed on their bottoms and tops to insure even supporting of the chains in the same plane. The inner and outer sides of these rail-heads are planed at an angle to fit the beveled inner faces of the flanges, as shown in Fig. 11.

To properly form the joint between the rails and at the same time allow for expansion and contraction, we preferably fork the end of one rail or cut its central portion away to receive the end portion of the next rail, which is cut away to fit therein, and through these overlapping portions extend bolts 15, which pass through a slot in one of the rails to allow end movement and give a slip-joint at such points.

To hold the chains in place and guide them at the joints, we provide side guides 16, as shown in Figs. 9 and 11, these being preferably secured by the bolts 15 and having upper wings 17 with flaring mouths. These guides receive the chain between them at the joints on the upper track and are spaced at any desired distances apart. The upper track extends from near the front end of the leer to a point beyond the back end, as shown in Fig. 5, and the chains at this rear end pass over sprocket-wheels 18, mounted upon a shaft 19, driven through gear-wheel 20. On the lower part of their travel the chain-rollers rest upon tracks, which may consist of angle-irons 21, secured to suitable vertical supports 22, as shown in Fig. 7. This lower track is also preferably provided with side guides 23, (shown in Figs. 7 and 8,) which hold the chains in place on their lower path.

At the front end of the leer the chains pass over curved shoes 24, supported on a cross-rail 25. This rail may be adjusted vertically by wedges 25' between its upper face and the shoes. It may also be adjusted by outside wedges 27, which bear upon the lower ends of the web of the rail 25, these ends projecting through slots in iron boxes 28', set in the side walls. The wedges 27 are provided with holding-screws 28 to secure them in adjusted position, and to clamp the rail in place after the wedges 25' are adjusted we provide the screws 26, which extend through the base-flanges of the rail and bear upon the lower portions of the curved shoes. We may thus adjust the rail vertically and also adjust the shoes on the rail. The rails 29 have supports 30, which are also provided with adjusting-screws 31 and with end wedges, the same as those for supports 25. We thus do away with the necessity for sprocket-wheels at this inner end, where they would soon get out of order, owing to the higher temperature at this point.

To equalize the temperature on the plates, we provide a series of longitudinal flues 32, which extend between the upper and the lower portions of the chain from the front end of the leer for a considerable portion of its length. At their rear ends these flues connect with a cross-flue leading to side chimneys 33, through which the products of combustion are taken away. These flues may be arranged in pairs, as indicated in the left-hand portion of Fig. 6, or in any other desirable manner, and we have shown spaces between the sets of flues as filled with concrete 34. The floor between the rails of the upper tracks may be formed by plates or tiles 35, and the rails themselves are preferably embedded in refractory material 36, as shown in Fig. 6, this material being filled in on both sides of the webs of these rails to protect them from the heat.

The lower tracks for the rails are preferably cut away at several points in their length to allow the chains to sag down within such portions, as shown in Figs. 3, 4, and 5, so that the weight of the chain will take up wear and lost motion and keep them taut on the upper part of their travel.

The roof and sides of the leer are provided with openings 37, which may be shut by suitable closures 38.

In the operation of the leer the plates of glass are pushed forward from the chamber 2 onto the chains, which are then moved forward a sufficient distance to allow them to receive the next sheet, the motion of the chains being intermittent. When the leer is filled, the plates are taken off intermittently at the rear end of the leer, gas is supplied to the burner 39 in front of the bridge-wall 40, Fig. 3, and the flame and products pass over the bridge-wall and through the flues to the side chimney. The heat from the chamber 2 passes into the leer-chamber and is also drawn through the flues, and as the plates pass through the leer in the same plane they are thoroughly annealed with little or no breakage. As the links of the chain pass through the different temperatures in the different parts of the leer they are all kept at a substantially even heat and checking and breakage of the glass thus avoided. The machining of the links and rails gives an even plane-face bed for the plates, affording uniform support. The shoes at the front end of the chain-supports do away with the necessity for sprocket-wheels, and the whole construction is adapted for long service and allows for the expansion and contraction of the metal parts without injuring the apparatus or the plates.

Many changes may be made in the form and arrangement of the various parts without departing from our invention.

We claim—

1. A glass-leer having chain carriers having an upper and lower path of travel and provided with rollers, part of said rollers having flanges on one side, and others having flanges on the opposite side, and longitudinal supports for the rollers in the upper path of the chain; substantially as described.

2. A glass-leer having endless-chain carriers arranged with an upper and lower path of travel, side guides arranged to engage the links of the chain in the upper part of their travel, and mechanism for operating the chains; substantially as described.

3. A glass-leer having endless-chain carriers, mechanism for actuating the same, the links having flat upper edges forming a substantially continuous surface to receive the glass, supporting-rollers at each joint, the peripheries of the rollers being below the said edges of the links in the upper path of travel, and tracks upon which the rollers move in said upper path of travel; substantially as described.

4. A glass-leer having endless-chain carriers, mechanism for actuating the carriers, curved shoes over which the chains pass at the front end of their travel and mechanism for adjusting the shoes; substantially as described.

5. A glass-leer having endless-chain carriers arranged with an upper and lower path of travel, longitudinal rails supporting the chains in the upper part of their travel, and guides arranged to direct the pieces of glass into the intermediate spaces between the chains; substantially as described.

6. A glass-leer having endless-chain carriers, and heating-flues extending between the upper and lower paths of the chains; substantially as described.

7. A glass-leer having endless-chain carriers with an upper and lower path of travel and provided with rollers, and rails supporting the chains throughout the upper part of their travel, the succeeding rollers having flanges on alternate sides; substantially as described.

8. A glass-leer having longitudinal chain carriers, with an upper and lower path of travel provided with rollers, longitudinal rails upon which the rollers rest throughout the upper path of their travel, said rails having expansion-joints, and side guides arranged to engage the links of the chains and hold the chains against lateral movement; substantially as described.

In testimony whereof we have hereunto set our hands.

ROBT. NAYSMITH.
B. F. REESE.

Witnesses:
C. P. BYRNES,
H. M. CORWIN.